United States Patent
Kamahori et al.

(10) Patent No.: US 9,580,569 B2
(45) Date of Patent: Feb. 28, 2017

(54) RUBBER COMPOSITION FOR TIRE FOR HEAVY LOADS, AND PNEUMATIC TIRE

(71) Applicant: The Yokohama Rubber Co., LTD., Minato-ku, Tokyo (JP)

(72) Inventors: Ayako Kamahori, Hiratsuka (JP); Mizuki Takeuchi, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 14/770,439

(22) PCT Filed: Feb. 25, 2014

(86) PCT No.: PCT/JP2014/054588
§ 371 (c)(1),
(2) Date: Aug. 25, 2015

(87) PCT Pub. No.: WO2014/129664
PCT Pub. Date: Aug. 28, 2014

(65) Prior Publication Data
US 2016/0002433 A1 Jan. 7, 2016

(30) Foreign Application Priority Data

Feb. 25, 2013 (JP) .................................. 2013-035029

(51) Int. Cl.
C08L 7/00 (2006.01)
C08K 3/04 (2006.01)
C08G 77/28 (2006.01)
B60C 1/00 (2006.01)

(52) U.S. Cl.
CPC ............. C08K 3/04 (2013.01); B60C 1/0016 (2013.04); C08L 7/00 (2013.01); B60C 2200/06 (2013.04); C08G 77/28 (2013.01)

(58) Field of Classification Search
CPC ............. C08L 7/00; C08K 3/04; C08G 77/28
USPC ....................................... 524/575.5
See application file for complete search history.

(56) References Cited

U.S. PATENT DOCUMENTS

| | | | |
|---|---|---|---|
| 6,331,605 B1 | 12/2001 | Lunginsland et al. | |
| 6,608,145 B1 * | 8/2003 | Lin | C08K 3/36 524/262 |
| 2003/0109614 A1 * | 6/2003 | Luginsland | C08G 77/28 524/261 |
| 2006/0217473 A1 * | 9/2006 | Hergenrother | B60C 1/0016 524/261 |
| 2011/0180195 A1 | 7/2011 | Hergenrother et al. | |
| 2014/0005431 A1 | 1/2014 | Hirokami et al. | |
| 2014/0011924 A1 | 1/2014 | Hergenrother et al. | |
| 2014/0213708 A1 | 7/2014 | Kushida | |

FOREIGN PATENT DOCUMENTS

| | | |
|---|---|---|
| JP | 2000-038395 | 2/2000 |
| JP | 2001-192454 | 7/2001 |
| JP | 2003-113243 | 4/2003 |
| JP | 2004-511598 | 4/2004 |
| JP | 2008-537740 | 9/2008 |
| JP | 2011-057967 | 3/2011 |
| JP | 2012-097257 | 5/2012 |
| JP | 2014-028797 | 2/2014 |
| WO | WO 02/31034 | 4/2002 |
| WO | WO 2004/056918 | 7/2004 |
| WO | WO 2006/102518 | 9/2006 |
| WO | WO 2013/031488 | 3/2013 |
| WO | WO 2014/002750 | 1/2014 |
| WO | WO 2014/034673 | 3/2014 |

OTHER PUBLICATIONS

Chenchy J. Lin, William L. Hergenrother, Ashley S. Hilton, Reduction of Volatile Organic Compound Emission. II., Use of Alkoxy-Modified Silsesquioxane for Compounding, Silica-Filled Rubbers, Journal of Applied Polymer Science, Aug. 12, 2008, pp. 655-664, vol. 115, Wiley Periodicals, Inc., Akron, Ohio, United States.

* cited by examiner

Primary Examiner — Kelechi Egwim
(74) Attorney, Agent, or Firm — Thorpe North & Western

(57) ABSTRACT

A rubber composition for a tire for heavy loads of the present technology comprises: diene rubber containing at least 60% by mass of natural rubber; silica; carbon black; and a silane coupling agent. The silane coupling agent is polysiloxane represented by a specific average compositional formula. The content of the silica is from 5 to 50 parts by mass per 100 parts by mass of the diene rubber. The content of the carbon black is from 5 to 40 parts by mass per 100 parts by mass of the diene rubber. The total content of the silica and the carbon black (R) is from 30 to 70 parts by mass per 100 parts by mass of the diene rubber. The content of the silane coupling agent is from 2 to 20% by mass of the silica content.

20 Claims, 1 Drawing Sheet

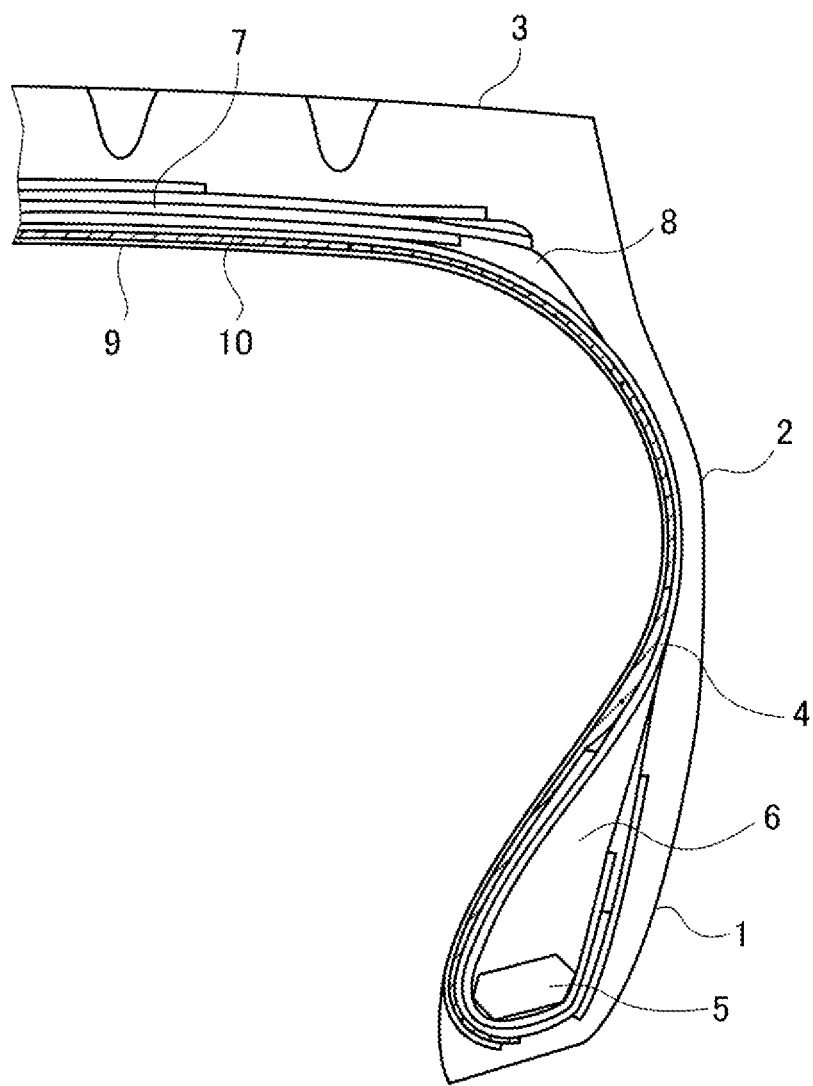

RUBBER COMPOSITION FOR TIRE FOR HEAVY LOADS, AND PNEUMATIC TIRE

TECHNICAL FIELD

The present technology relates to a rubber composition for a tire for heavy loads and a pneumatic tire.

BACKGROUND

Tires for heavy load vehicles, such as trucks and buses, (tires for heavy loads) are required to have characteristics such as wear resistance, cut resistance, and low heat build-up. Under such circumstances, as a rubber composition for a tire for heavy loads, a rubber composition in which carbon black and/or silica is blended in a rubber component having natural rubber as a main component is typically used.

For example, Japanese Unexamined Patent Application Publication No. 2011-57967 discloses a rubber composition for tire treads which is suitable for pneumatic tires for heavy loads, the rubber composition comprising: diene rubber containing at least 50% by mass of natural rubber; silica; a particular carbon black; and a silane coupling agent (claims, paragraph [0031]). Furthermore, in its working examples, Si69 (bis(3-(triethoxysilyl)propyl) tetrasulfide, manufactured by Evonik Degussa) is used as the silane coupling agent. Japanese Unexamined Patent Application Publication No. 2011-57967 describes that both wear resistance and low heat build-up of the tire can be achieved by using a rubber composition having such a constitution.

When the inventors of the present technology investigated into a rubber composition comprising: diene rubber containing at least 50% by mass of natural rubber; silica; carbon black; and a silane coupling agent, using Japanese Unexamined Patent Application Publication No. 2011-57967 as a reference, it was found that, although the obtained tire exhibits excellent wear resistance, if heavy load tires are required to have even higher performances in the future, the cut resistance and low heat build-up of the obtained tire may not be sufficient to satisfy such a requirement.

Further enhancement of characteristics such as wear resistance, cut resistance, and low heat build-up, has been desired for tires for heavy loads to enhance safety, fuel consumption, and the like of heavy load vehicles.

SUMMARY

The present technology provides a rubber composition for a tire for heavy loads and a pneumatic tire, the rubber composition exhibiting excellent wear resistance, cut resistance, and low heat build-up when formed into a tire.

A rubber composition for a tire for heavy loads that exhibits excellent wear resistance, cut resistance, and low heat build-up when formed into a tire can be obtained by using a particular polysiloxane as a silane coupling agent.

(1) A rubber composition for a tire for heavy loads comprising: diene rubber (P) containing at least 60% by mass of natural rubber; silica (Q); carbon black (R); and a silane coupling agent (S);

the silane coupling agent (S) being polysiloxane represented by an average compositional formula of formula (1) below;

a content of the silica (Q) being from 5 to 50 parts by mass per 100 parts by mass of the diene rubber (P);

a content of the carbon black (R) being from 5 to 40 parts by mass per 100 parts by mass of the diene rubber (P);

a total content of the silica (Q) and the carbon black (R) being from 30 to 70 parts by mass per 100 parts by mass of the diene rubber (P); and a content of the silane coupling agent (S) being from 2 to 20% by mass relative to the content of the silica (Q):

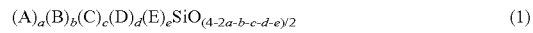

$$(A)_a(B)_b(C)_c(D)_d(E)_e SiO_{(4-2a-b-c-d-e)/2} \qquad (1)$$

wherein, A represents a divalent organic group having a sulfide group; B represents a monovalent hydrocarbon group having from 5 to 10 carbons; C represents a hydrolyzable group; D represents an organic group having a mercapto group; E represents a monovalent hydrocarbon group having from 1 to 4 carbons; and a to e satisfy relationships of formulas: $0 \le a \le 1$, $0 \le b < 1$, $0 < c < 3$, $0 < d < 1$, $0 \le e < 2$, and $0 < 2a+b+c+d+e < 4$; however, either one of a or b is not 0.

(2) The rubber composition for a tire for heavy loads according to (1) above, wherein a nitrogen adsorption specific surface area of the carbon black (R) is from 60 to 150 $m^2/g$.

(3) The rubber composition for a tire for heavy loads according to (1) or (2) above, wherein, in the formula (1), a is greater than 0.

(4) The rubber composition for a tire for heavy loads according to any one of (1) to (3) above, wherein, in the formula (1), b is greater than 0.

(5) The rubber composition for a tire for heavy loads according to any one of (1) to (4) above, wherein the rubber composition is used for a tire tread.

(6) The rubber composition for a tire for heavy loads according to any one of (1) to (4) above, wherein the rubber composition is used for a bead filler.

(7) A pneumatic tire produced by using the rubber composition for a tire for heavy loads described in any one of (1) to (4) above.

(8) A pneumatic tire produced by using the rubber composition for a tire for heavy loads described in any one of (1) to (4) above for a tire tread.

(9) A pneumatic tire produced by using the rubber composition for a tire for heavy loads described in any one of (1) to (4) above for a bead filler.

According to the present technology, as described below, a rubber composition for a tire for heavy loads, which exhibits excellent wear resistance, cut resistance, and low heat build-up when formed into a tire, can be provided.

BRIEF DESCRIPTION OF THE DRAWING(S)

FIG. 1 is a partial cross-sectional schematic view of a tire that represents one embodiment of the pneumatic tire of the present technology.

DETAILED DESCRIPTION

Hereinafter, a rubber composition for a tire for heavy loads of the present technology and a pneumatic tire using the rubber composition for a tire for heavy loads of the present technology will be described.

Rubber Composition for Tire for Heavy Loads

The rubber composition for a tire for heavy loads of the present technology (hereinafter, also referred to as "composition of the present technology") comprises: diene rubber (P) containing at least 60% by mass of natural rubber; silica (Q); carbon black (R); and a silane coupling agent (S); the silane coupling agent (S) being polysiloxane represented by an average compositional formula of formula (1) described below; a content of the silica (Q) being from 5 to 50 parts by mass per 100 parts by mass of the diene rubber (P); a content of the carbon black (R) being from 5 to 40 parts by mass per 100 parts by mass of the diene rubber (P); a total content of the silica (Q) and the carbon black (R) being from 30 to 70 parts by mass per 100 parts by mass of the diene rubber (P); and a content of the silane coupling agent (S) being from 2 to 20% by mass relative to the content of the silica (Q).

It is conceived that, since the composition of the present technology has such a constitution, the composition exhibits excellent wear resistance, cut resistance, and low heat build-up when formed into a tire.

Although the reason is not clear, it is assumed to be as follows.

As described below, polysiloxane represented by an average compositional formula of formula (1) (hereinafter, also referred to as "particular polysiloxane") has a hydrolyzable group and a mercapto group.

Since the composition of the present technology contains diene rubber having natural rubber, as a main component, and the particular polysiloxane described above, the mercapto group of the particular polysiloxane interacts with natural rubber, and the hydrolyzable group of the particular polysiloxane and the polysiloxane structure also interact with the silica, thereby uniformly dispersing the silica in microparticle form in the rubber component. As a result, it is conceived that hysteresis loss is reduced, and excellent low heat build-up is exhibited. Furthermore, since the silica is uniformly dispersed in microparticle form in the rubber component, it is conceived that toughness is enhanced and, as a result, excellent cut resistance is exhibited.

This is also assumed from the fact that the low heat build-up and cut resistance become insufficient when a conventional silane coupling agent is used as the silane coupling agent as described in Comparative Example 1 below.

Furthermore, it is conceived that, since the total content of the silica and the carbon black is a particular amount relative to the diene rubber as described above, the composition of the present technology exhibits excellent wear resistance, and by setting the amounts of the carbon black and the silica to be particular amounts, both the excellent wear resistance and excellent low heat build-up can be achieved. Furthermore, it is conceived that, since the composition of the present technology contains a particular polysiloxane, the composition can be mixed at a lower temperature than that for conventional silane coupling agents, thereby enabling the suppression of cutting of molecules in natural rubber due to heat. It is thus conceived that excellent wear resistance and excellent cut resistance can be exhibited as a result.

Each component contained in the composition of the present technology will be described in detail hereinafter.

Diene Rubber (P)

The diene rubber (P) contained in the composition of the present technology is diene rubber containing at least 60% by mass of natural rubber. The content of the natural rubber in the diene rubber is preferably from 70 to 100% by mass, and more preferably from 80 to 100% by mass, from the perspective of achieving better cut resistance of the obtained tire.

The diene rubber (P) may contain another diene rubber other than the natural rubber as long as the diene rubber (P) contains at least 60% by mass of the natural rubber.

The diene rubber other than the natural rubber is not particularly limited; however, examples of the diene rubber other than the natural rubber include isoprene rubber (IR), butadiene rubber (BR), acrylonitrile-butadiene copolymer rubber (NBR), butyl rubber (IIR), butyl halide rubber (Br-IIR, Cl-IIR), chloroprene rubber (CR), and the like. Among these, from the perspective of achieving better wear resistance of the obtained tire, butadiene rubber (BR) is preferable.

Silica (Q)

The silica (Q) contained in the composition of the present technology is not particularly limited, and any conventionally known silica that is blended in rubber compositions for the use in tires or the like can be used.

Examples of the silica (Q) include wet silica, dry silica, fumed silica, diatomaceous earth, and the like. As the silica (Q), a single type of silica may be used alone, or two or more types of silicas may be used in combination.

The content of the silica (Q) is from 5 to 50 parts by mass per 100 parts by mass of the diene rubber (P), and from the perspective of achieving better balance of low heat build-up and wear resistance, the content of the silica (Q) is preferably from 10 to 50 parts by mass.

Carbon Black (R)

The carbon black (R) contained in the composition of the present technology is not particularly limited and, for example, carbon blacks with various grades, such as SAF-HS, SAF, ISAF-HS, ISAF, ISAF-LS, IISAF-HS, HAF-HS, HAF, HAF-LS, and FEF, can be used.

The nitrogen adsorption specific surface area ($N_2SA$) of the carbon black is preferably from 60 to 150 $m^2/g$, more preferably greater than 60 $m^2/g$ but 150 $m^2/g$ or less, and even more preferably from 90 to 150 $m^2/g$, from the perspective of achieving better wear resistance of the obtained tire.

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

The content of the carbon black (R) is from 5 to 40 parts by mass per 100 parts by mass of the diene rubber (P), and from the perspective of achieving better balance of low heat build-up and wear resistance, the content of the carbon black (R) is preferably from 5 to 20 parts by mass.

The total content of the silica (Q) and the carbon black (R) is from 30 to 70 parts by mass per 100 parts by mass of the diene rubber (P), and from the perspective of achieving better balance of low heat build-up and wear resistance, the total content of the silica (Q) and the carbon black (R) is preferably from 40 to 60 parts by mass.

If the total content of the silica (Q) and the carbon black (R) is less than 30 parts by mass per 100 parts by mass of the diene rubber (P), cut resistance and wear resistance will be insufficient.

Silane Coupling Agent (S)

The silane coupling agent (S) contained in the composition of the present technology is polysiloxane (particular polysiloxane) represented by an average compositional formula of formula (1) below.

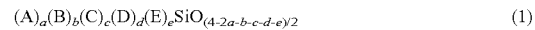

$$(A)_a(B)_b(C)_c(D)_d(E)_e SiO_{(4-2a-b-c-d-e)/2} \quad (1)$$

In formula (1) above, A represents a divalent organic group (hereinafter, also referred to as "sulfide group-containing organic group") having a sulfide group. Among these, the divalent organic group is preferably a group represented by formula (2) below.

$$*\text{---}(CH_2)_n\text{---}S_x\text{---}(CH_2)_n\text{---}* \quad (2)$$

In formula (2) above, n is an integer from 1 to 10 and, in particular, n is preferably an integer from 2 to 4.

In formula (2) above, x is an integer from 1 to 6 and, in particular, n is preferably an integer from 2 to 4.

In formula (2) above, * represents a binding position.

Specific examples of the group represented by formula (2) above include *—CH$_2$—S$_2$—CH$_2$—*, *—C$_2$H$_4$—S$_2$—C$_2$H$_4$—*, *—C$_3$H$_6$—S$_2$—C$_3$H$_6$—*, *—C$_4$H$_8$—S$_2$—C$_4$H$_8$—*, *—CH$_2$—S$_4$—CH$_2$—*, *—C$_2$H$_4$—S$_4$—C$_2$H$_4$—*, *—C$_3$H$_6$—S$_4$—C$_3$H$_6$—*, *—C$_4$H$_8$—S$_4$—C$_4$H$_8$—*, and the like.

In formula (1) above, B represents a monovalent hydrocarbon group having from 5 to 10 carbons. Specific examples thereof include a hexyl group, octyl group, decyl group, and the like.

In formula (1) above, C represents a hydrolyzable group. Specific examples thereof include an alkoxy group, phenoxy group, carboxyl group, alkenyloxy group, and the like. Among these, the hydrolyzable group is preferably a group represented by formula (3) below.

*—OR$^2$     (3)

In formula (3) above, R$^2$ represents an alkyl group having from 1 to 20 carbons, an aryl group having from 6 to 10 carbons, an aralkyl group having from 6 to 10 carbons (aryl alkyl group), or an alkenyl group having from 2 to 10 carbons. Among these, an alkyl group having from 1 to 5 carbons is preferable. Specific examples of the alkyl group having from 1 to 20 carbons include a methyl group, ethyl group, propyl group, butyl group, hexyl group, octyl group, decyl group, octadecyl group, and the like. Specific examples of the aryl group having from 6 to 10 carbons include a phenyl group, tolyl group, and the like. Specific examples of the aralkyl group having from 6 to 10 carbons include a benzyl group, phenylethyl group, and the like. Specific examples of the alkenyl group having from 2 to 10 carbons include a vinyl group, propenyl group, pentenyl group, and the like.

In formula (3) above, * represents a binding position.

In formula (1), D represents an organic group having a mercapto group. Among these, the organic group having a mercapto group is preferably a group represented by formula (4) below.

*—(CH$_2$)$_m$—SH     (4)

In formula (4) above, m is an integer from 1 to 10 and, in particular, m is preferably an integer from 1 to 5.

In formula (4) above, * represents a binding position.

Specific examples of the group represented by formula (4) above include *—CH$_2$SH, *—C$_2$H$_4$SH, *—C$_3$H$_6$SH, *—C$_4$H$_8$SH, *—C$_5$H$_{10}$SH, *—C$_6$H$_{12}$SH, *—C$_7$H$_{14}$SH, *—C$_8$H$_{16}$SH, *—C$_9$H$_{18}$SH, and *—C$_{10}$H$_{20}$SH.

In formula (1) above, E represents a monovalent hydrocarbon group having from 1 to 4 carbons.

In formula (1) above, a to e satisfy relationships of formulas: 0≤a≤1, 0≤b<1, 0<c<3, 0<d<1, 0≤e<2, and 0<2a+b+c+d+e<4; however, either one of a or b is not 0.

From the perspective of achieving better cut resistance and low heat build-up of the obtained tire, in the particular polysiloxane, a is preferably greater than 0 (0<a). That is, the particular polysiloxane preferably has a sulfide group-containing organic group. Among these, from the perspective of achieving even better low heat build-up, a preferably satisfies 0<a≤0.50.

In formula (1) above, from the perspective of achieving better low heat build-up of the obtained tire, b is preferably greater than 0 (0<b), and b preferably satisfies 0.10≤b≤0.89.

In formula (1) above, from the perspective of achieving better low heat build-up and better dispersibility of silica of the obtained tire, c preferably satisfies 1.2≤c≤2.0.

In formula (1) above, from the perspective of achieving better low heat build-up of the obtained tire, d preferably satisfies 0.1≤d≤0.8.

From the perspective of achieving even better dispersibility of silica, the particular polysiloxane is preferably a polysiloxane having a group represented by formula (2) above as A in formula (1) above, a group represented by formula (3) above as C in formula (1) above, and a group represented by formula (4) above as D in formula (1).

The weight average molecular weight of the particular polysiloxane is preferably from 500 to 2000, and more preferably from 600 to 1800, from the perspective of achieving better low heat build-up of the obtained tire. The molecular weight of the particular polysiloxane of the present application is the molecular weight determined in terms of polystyrene by gel permeation chromatography (GPC) using toluene as a solvent.

The mercapto equivalent weight of the particular polysiloxane determined by the acetic acid/potassium iodide/potassium iodate addition-sodium thiosulfate solution titration method is preferably from 550 to 1900 g/mol, and more preferably from 600 to 180 g/mol, from the perspective of having excellent vulcanization reactivity.

The particular polysiloxane preferably has 2 to 50 siloxane units (—Si—O—) from the perspective of achieving better low heat build-up of the obtained tire.

Note that other metal atoms other than a silicon atom (e.g. Sn, Ti, and Al) are not present in the backbone of the particular polysiloxane.

Although the method for producing the particular polysiloxane is not particularly limited, a first preferred embodiment is a method of subjecting an organosilicon compound represented by formula (6) below and an organosilicon compound represented by formula (7) below to hydrolysis-condensation. Furthermore, a second preferred embodiment is a method of subjecting an organosilicon compound represented by formula (5) below, an organosilicon compound represented by formula (6) below, and an organosilicon compound represented by formula (7) below to hydrolysis-condensation. Furthermore, a third preferred embodiment is a method of subjecting an organosilicon compound represented by formula (5) below, an organosilicon compound represented by formula (6) below, an organosilicon compound represented by formula (7) below, and an organosilicon compound represented by formula (8) below to hydrolysis-condensation.

Among these, from the perspective of achieving better cut resistance and low heat build-up of the obtained tire, the second preferred embodiment is preferable.

Formula 1

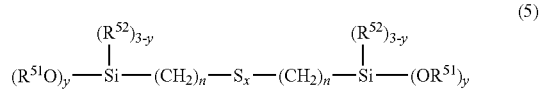

$(R^{51}O)_y$—$\underset{\underset{(R^{52})_{3-y}}{|}}{Si}$—$(CH_2)_n$—$S_x$—$(CH_2)_n$—$\underset{\underset{(R^{52})_{3-y}}{|}}{Si}$—$(OR^{51})_y$     (5)

In formula (5) above, R$^{51}$ represents an alkyl group having from 1 to 20 carbons, an aryl group having from 6 to 10 carbons, or an alkenyl group having from 2 to 10 carbons. Among these, an alkyl group having from 1 to 5 carbons is preferable. Specific examples of the alkyl group having from 1 to 20 carbons include a methyl group, ethyl group, propyl group, butyl group, hexyl group, octyl group, decyl group, octadecyl group, and the like. Specific examples of the aryl group having from 6 to 10 carbons include a phenyl group, tolyl group, naphthyl group, and the like. Specific examples of the alkenyl group having from 2 to 10 carbons include a vinyl group, propenyl group, pentenyl group, and the like.

In formula (5) above, $R^{52}$ represents an alkyl group having from 1 to 10 carbons or an aryl group having from 6 to 10 carbons. Specific examples of the alkyl group having from 1 to 10 carbons include a methyl group, ethyl group, propyl group, butyl group, hexyl group, octyl group, decyl group, and the like. Specific examples of the aryl group having from 6 to 10 carbons are the same as those for $R^{51}$ described above.

In formula (5) above, definition and preferred embodiment of n are the same as those for n described above.

In formula (5) above, definition and preferred embodiment of x are the same as those for x described above.

In formula (5) above, y is an integer of 1 to 3.

Specific examples of the organosilicon compound represented by formula (5) above include bis(trimethoxysilylpropyl)tetrasulfide, bis(triethoxysilylpropyl)tetrasulfide, bis(trimethoxysilylpropyl)disulfide, bis(triethoxysilylpropyl)disulfide, and the like.

Formula 2

(6)

In formula (6) above, definition, specific examples, and preferred embodiment of $R^{61}$ are the same as those for $R^{51}$ described above.

In formula (6) above, definition, specific examples, and preferred embodiment of $R^{62}$ are the same as those for $R^{52}$ described above.

In formula (6) above, definition of z is the same as that for y described above.

In formula (6) above, p is an integer of 5 to 10.

Specific examples of the organosilicon compound represented by formula (6) above include pentyltrimethoxysilane, pentylmethyldimethoxysilane, pentyltriethoxysilane, pentylmethyldiethoxysilane, hexyltrimethoxysilane, hexylmethyldimethoxysilane, hexyltriethoxysilane, hexylmethyldiethoxysilane, octyltrimethoxysilane, octylmethyldimethoxysilane, octyltriethoxysilane, octylmethyldiethoxysilane, decyltrimethoxysilane, decylmethyldimethoxysilane, decyltriethoxysilane, decylmethyldiethoxysilane, and the like.

Formula 3

(7)

In formula (7) above, definition, specific examples, and preferred embodiment of $R^{71}$ are the same as those for $R^{51}$ described above.

In formula (7) above, definition, specific examples, and preferred embodiment of $R^{72}$ are the same as those for $R^{52}$ described above.

In formula (7) above, definition and preferred embodiment of m are the same as those for m described above.

In formula (7) above, definition of w is the same as that for y described above.

Specific examples of the organosilicon compound represented by formula (7) above include α-mercaptomethyltrimethoxysilane, α-mercaptomethylmethyldimethoxysilane, α-mercaptomethyltriethoxysilane, α-mercaptomethylmethyldiethoxysilane, γ-mercaptopropyltrimethoxysilane, γ-mercaptopropylmethyldimethoxysilane, γ-mercaptopropyltriethoxysilane, γ-mercaptopropylmethyldiethoxysilane, and the like.

Formula 4

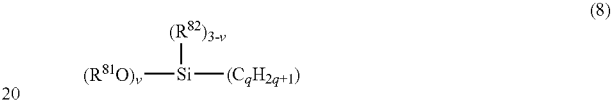

(8)

In formula (8) above, definition, specific examples, and preferred embodiment of $R^{81}$ are the same as those for $R^{51}$ described above.

In formula (8) above, definition, specific examples, and preferred embodiment of $R^{82}$ are the same as those for $R^{52}$ described above.

In formula (8) above, definition of v is the same as that for y described above.

In formula (8) above, q is an integer of 1 to 4.

Specific examples of the organosilicon compound represented by formula (8) above include methyltrimethoxysilane, dimethyldimethoxysilane, methyltriethoxysilane, methylethyldiethoxysilane, propyltrimethoxysilane, propylmethyldimethoxysilane, propylmethyldiethoxysilane, and the like.

When the particular polysiloxane is produced, a solvent can be used as necessary. Although the solvent is not particularly limited, specific examples of the solvent include aliphatic hydrocarbon-based solvents such as pentane, hexane, heptane, and decane, ether-based solvents such as diethyl ether, tetrahydrofuran, and 1,4-dioxane, amide-based solvents such as formamide, dimethyl formamide, and N-methyl pyrrolidone, aromatic hydrocarbon-based solvents such as benzene, toluene, and xylene, alcohol-based solvents such as methanol, ethanol, and propanol, and the like.

When the particular polysiloxane is produced, a catalyst can be used as necessary. Examples of the catalyst include acidic catalysts such as hydrochloric acid and acetic acid, Lewis acid catalysts such as ammonium fluoride, alkali metal salts such as sodium hydroxide, potassium hydroxide, sodium carbonate, sodium acetate, potassium acetate, sodium bicarbonate, potassium carbonate, potassium bicarbonate, calcium carbonate, sodium methoxide, and sodium ethoxide, amine compounds such as triethylamine, tributylamine, pyridine, and 4-dimethylaminopyridine, and the like.

The catalyst is preferably not an organometal compound containing Sn, Ti, or Al as its metal. When such an organometal compound is used, the particular polysiloxane (metal atoms other than a silicon atom (e.g. Sn, Ti, and Al) are not present in the backbone) may not be obtained since a metal is introduced to the polysiloxane backbone.

When a silane coupling agent having a mercapto group (e.g. organosilicon compound represented by formula (7)) and a silane coupling agent other than the silane coupling agent having a sulfide group or a mercapto group (e.g.

organosilicon compound represented by formula (6) or formula (8)) are used in combination as an organosilicon compound used in the production of the particular polysiloxane, the mixing ratio (mole ratio) of the silane coupling agent having a mercapto group to the silane coupling agent other than the silane coupling agent having a sulfide group or a mercapto group (silane coupling agent having a mercapto group/silane coupling agent other than the silane coupling agent having a sulfide group or a mercapto group) is preferably from 1.1/8.9 to 6.7/3.3, and more preferably from 1.4/8.6 to 5.0/5.0, from the perspective of achieving better wet performance, low rolling resistance, and processability.

When a silane coupling agent having a mercapto group (e.g. organosilicon compound represented by formula (7)) and a silane coupling agent having a sulfide group (e.g. organosilicon compound represented by formula (5)) are used in combination as an organosilicon compound used in the production of the particular polysiloxane, the mixing ratio (mole ratio) of the silane coupling agent having a mercapto group to the silane coupling agent having a sulfide group (silane coupling agent having a mercapto group/silane coupling agent having a sulfide group) is preferably from 2.0/8.0 to 8.9/1.1, and more preferably from 2.5/7.5 to 8.0/2.0, from the perspective of achieving better wet performance, low rolling resistance, and processability.

When a silane coupling agent having a mercapto group (e.g. organosilicon compound represented by formula (7)), a silane coupling agent having a sulfide group (e.g. organosilicon compound represented by formula (5) and/or), and a silane coupling agent other than the silane coupling agent having a sulfide group or a mercapto group (e.g. organosilicon compound represented by formula (6) or formula (8)) are used in combination as an organosilicon compound used in the production of the particular polysiloxane, the amount of the silane coupling agent having a mercapto group is preferably from 10.0 to 73.0% in the total amount (mole) of these three silane coupling agents. The amount of the silane coupling agent having a sulfide group is preferably from 5.0 to 67.0% in the total amount of these three silane coupling agents. The amount of the silane coupling agent other than the silane coupling agent having a sulfide group or a mercapto group is preferably from 16.0 to 85.0% in the total amount of these three silane coupling agents.

The content of the silane coupling agent (S) is from 2 to 20% by mass relative to the content of the silica (Q). From the perspective of achieving better low heat build-up of the obtained tire, the content of the silane coupling agent (S) is preferably from 4 to 18% by mass, more preferably from 5 to 14% by mass, and even more preferably from 8 to 12% by mass.

Optional Component

The composition of the present technology may further contain additives as necessary within a scope that does not inhibit the effect or purpose thereof.

Examples of the additives include various additives that are typically used in rubber compositions for tires, such as silane coupling agents other than the silane coupling agent (S) contained in the composition of the present technology, zinc oxide (flower of zinc), stearic acid, antiaging agents, processing aids, aroma oils, process oils, liquid polymers, terpene resins, thermosetting resins, vulcanizing agents, and vulcanization accelerators.

Hardness

The composition of the present technology preferably has a type A durometer hardness (hereinafter, also simply referred to as "durometer hardness") of 60 or higher that is measured at 20° C. in accordance with JIS K6253 after vulcanization, from the perspective of achieving better balance of low heat build-up and wear resistance.

Although the upper limit value of the durometer hardness is not particularly limited, the upper limit value is preferably 90 or lower, and more preferably 85 or lower.

Method of Producing Rubber Composition for Tire for Heavy Loads

The method of producing the composition of the present technology is not particularly limited, and specific examples thereof include a method whereby each of the abovementioned components is kneaded using a publicly known method and device (e.g. Banbury mixer, kneader, roll, and the like).

In addition, the composition of the present technology can be vulcanized or crosslinked under conventionally known vulcanizing or crosslinking conditions.

Use

The composition of the present technology is used for production of heavy load tires. Among these, from the perspective of achieving excellent wear resistance, cut resistance, and low heat build-up, the composition of the present technology is suitably used for tire treads of heavy load tires. Furthermore, the composition of the present technology is also suitably used as bead fillers of heavy load tires due to excellent fatigue resistance.

Pneumatic Tire

The pneumatic tire of the present technology is a pneumatic tire using the composition of the present technology described above in the tire (preferably in tire treads and/or bead fillers).

FIG. 1 is a partial cross-sectional schematic view of a tire that represents one embodiment of the pneumatic tire of the present technology, but the pneumatic tire of the present technology is not limited to the mode illustrated in FIG. 1.

In FIG. 1, the pneumatic tire is formed from a pair of right and left bead portions 1, a pair of right and left side walls 2, and a tire tread portion 3 extending between both of the side walls 2. A carcass layer 4 embedded with steel cords is mounted between the pair of right and left bead portions 3. An end of the carcass layer 4 is folded over and up from a tire inner side to a tire outer side around a bead core 5 and a bead filler 6. In the tire tread portion 3, a belt layer 7 is provided along the entire periphery of the tire on the outer side of the carcass layer 4. At the both end portions of the belt layer 7, belt cushions 8 are provided. In the inner surface of the pneumatic tire, an inner liner 9 is provided to avoid leakage of air charged in the tire inner portion to the outside of the tire. A tie rubber 10 is laminated in between the carcass layer 4 and the inner liner 9 to bond the inner liner 9.

The pneumatic tire of the present technology can be produced, for example, in accordance with a conventionally known method. In addition to ordinary air or air with an adjusted oxygen partial pressure, inert gasses such as nitrogen, argon, and helium can be used as the gas with which the tire is filled.

EXAMPLES

Hereinafter, the present technology will be further described in detail using examples; however, the present technology is not limited to these.

Synthesis Example 1

Particular Polysiloxane 1

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 L separable flask provided with an agitator, a reflux condenser, a dropping funnel and a thermometer, and then a mixed solution containing 37.8 g (2.1 mol) of 0.5 N hydrochloric acid and 75.6 g of ethanol was added in a dropwise manner at room temperature. It was then stirred for 2 hours at 80° C. Then, it was filtered, and 17.0 g of 5% KOH/EtOH solution was added in a dropwise manner, and stirred for 2 hours at 80° C. Then, by vacuum concentration and filtration, 480.1 g of polysiloxane in the form of a brown transparent liquid was obtained. As a result of measurement by GPC, the average molecular weight was 840, and the average degree of polymerization was 4.0 (preset degree of polymerization: 4.0). In addition, as a result of measuring the mercapto equivalent weight by the acetic acid/potassium iodide/potassium iodate addition/sodium thiosulfate solution titration method, the equivalent weight was 730 g/mol, and it was thus confirmed that the preset mercapto group content was achieved. From above, the obtained polysiloxane is represented by the following average compositional formula.

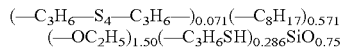

The obtained polysiloxane was used as the particular polysiloxane 1.

Synthesis Example 2

Particular Polysiloxane 2

190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 162.0 g of ethanol were placed in a 2 L separable flask provided with an agitator, a reflux condenser, a dropping funnel and a thermometer, and then a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 14.6 g of 5% KOH/EtOH solution was added in a dropwise manner, and stirred for 2 hours at 80° C. Then, by vacuum concentration and filtration, 412.3 g of polysiloxane in the form of a colorless transparent liquid was obtained. As a result of measurement by GPC, the average molecular weight was 850, and the average degree of polymerization was 4.0 (preset degree of polymerization: 4.0). In addition, as a result of measuring the mercapto equivalent weight by the acetic acid/potassium iodide/potassium iodate addition/sodium thiosulfate solution titration method, the equivalent weight was 650 g/mol, and it was thus confirmed that the preset mercapto group content was achieved. From above, the obtained polysiloxane is represented by the following average compositional formula.

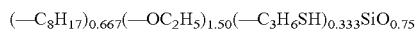

The obtained polysiloxane was used as the particular polysiloxane 2.

Synthesis Example 3

Comparative Polysiloxane 1

Using water and concentrated hydrochloric acid aqueous solution, 3-mercapto propyltrimethoxysilane (0.1 mol) was hydrolyzed and then ethoxymethylpolysiloxane (100 g) was added thereto to perform condensation. Thus, polysiloxane was obtained. The obtained polysiloxane was used as the comparative polysiloxane 1.

The comparative polysiloxane 1 had a structure in which the methoxy group of the 3-mercapto propyltrimethoxysilane and the ethoxy group of the ethoxymethylpolysiloxane were condensed. That is, the monovalent hydrocarbon group contained in the comparative polysiloxane 1 is only the methyl group. Furthermore, the comparative polysiloxane 1 does not contain a divalent organic group having a sulfide group.

Synthesis Example 4

Comparative Polysiloxane 2

Using water and concentrated hydrochloric acid aqueous solution, bis(3-(triethoxysilyl)propyl)tetrasulfide (0.1 mol) was hydrolyzed and then ethoxymethylpolysiloxane (100 g) was added thereto to perform condensation. Thus, polysiloxane was obtained. The obtained polysiloxane was used as the comparative polysiloxane 2.

The comparative polysiloxane 2 had a structure in which the ethoxy group of the bis(3-(triethoxysilyl)propyl)tetrasulfide and the ethoxy group of the ethoxymethylpolysiloxane were condensed. That is, the monovalent hydrocarbon group contained in the comparative polysiloxane 2 is only the methyl group. Furthermore, the comparative polysiloxane 2 does not contain an organic group having a mercapto group.

The components shown in Table 1 below were blended at the proportions (parts by mass) shown in Table 1 below.

Specifically, a master batch was obtained by first mixing the components described in Table 1 below, except for the sulfur and the accelerator, for 5 minutes in a 1.7 L closed type Banbury mixer, then discharging the mixture when the temperature reached 140±5° C., and cooling the mixture to the room temperature. Furthermore, the sulfur and the accelerator were mixed to the obtained master batch using the Banbury mixer to obtain a rubber composition.

In Table 1, a number in a parenthesis for the silane coupling agent indicates the content (% by mass) of the silane coupling agent relative to the content of the silica.

<Production of Vulcanized Rubber Sheet for Evaluation>

A vulcanized rubber sheet was prepared by press-vulcanizing the prepared (unvulcanized) rubber composition for tires for 20 minutes at 160° C. in a mold (15 cm×15 cm×0.2 cm).

<Hardness>

For the vulcanized rubber sheet produced as described above, type A durometer hardness was measured at 20° C. in accordance with JIS K6253. The results are shown in Table 1.

<Wear Resistance>

For the vulcanized rubber sheet produced as described above, abrasion loss was measured in accordance with JIS K6264-1 2:2005 using a Lambourn abrasion tester (manufactured by Iwamoto Seisakusho) at a temperature of 20° C. and at a slip ratio of 50%.

The results are shown in Table 1. The results were shown as index values obtained by the following formula, with the amount of wear of Comparative Example 1 expressed as 100. A higher index value indicates a smaller amount of wear, which indicates excellent wear resistance when formed into a tire.

Wear resistance=(amount of wear of Comparative Example 1/amount of wear of other comparative example or working example)×100

<Cut Resistance>

To the vulcanized rubber sheet produced as described above, a needle having a length of 40 mm and a diameter of 4 mm was dropped at a tip angle of 90° from a height of 150 mm with a load of 29.4 N. How deep the needle pierced was measured. The results are shown in Table 1. The results were shown as index values obtained by the following formula, with the depth of Comparative Example 1 expressed as 100. A higher index value indicates a superior cut resistance when a tire is formed.

Cut resistance=(needle pierce depth of Comparative Example 1/needle pierce depth of other comparative example or working example)×100

<Low Heat Build-Up>

For the vulcanized rubber sheet produced as described above, tan δ (60° C.) was measured using a viscoelastic spectrometer (manufactured by Iwamoto Seisakusho) in accordance with JIS K6394:2007 under the following conditions: a strain of tensile deformation of 10%±2%; a frequency of 20 Hz; and a temperature of 60° C.

The results are shown in Table 1. The results were shown as index values, with the tan δ (60° C.) of Comparative Example 1 expressed as 100. A smaller index value indicates a smaller tan δ (60° C.), which indicates a superior low heat build-up when a tire is formed.

<Fatigue Resistance>

For the vulcanized rubber sheet produced as described above, the number of breakage was measured, in accordance with JIS K6270:2001, by punching out a JIS No. 3 dumbbell shape test piece, and repeatedly applying a strain of 60% thereto.

The results are shown in Table 1. The results were shown as index values, with the result of Comparative Example 1 expressed as 100. A higher index value indicates a superior fatigue resistance when a tire is formed. Practically, the index value is preferably 105 or higher.

TABLE 1

| Table 1-1 | Comparative Example 1 | Comparative Example 2 | Comparative Example 3 | Comparative Example 4 |
|---|---|---|---|---|
| NR | 80 | 50 | 80 | 80 |
| BR | 20 | 50 | 20 | 20 |
| Silica | 40 | 40 | | 20 |
| CB1 | 10 | 10 | 45 | 5 |
| CB2 | | | | |
| CB3 | | | | |
| Silane coupling agent 1 | | 4 (10) | 4 | 4 (20) |
| Silane coupling agent 2 | | | | |
| Silane coupling agent X1 | 4 (10) | | | |
| Silane coupling agent X2 | | | | |
| Silane coupling agent X3 | | | | |
| Stearic acid | 1.5 | 1.5 | 1.5 | 1.5 |
| Sulfur | 2.3 | 2.3 | 2.3 | 2.3 |
| Accelerator | 1.4 | 1.4 | 1.4 | 1.4 |
| Hardness | 64 | 64 | 66 | 56 |
| Wear resistance | 100 | 107 | 110 | 94 |
| Cut resistance | 100 | 95 | 110 | 94 |
| Low heat build-up | 100 | 90 | 116 | 88 |
| Fatigue resistance | 100 | 99 | 84 | 110 |

TABLE 2

| Table 1-2 | Working Example 1 | Working Example 2 | Working Example 3 | Working Example 4 |
|---|---|---|---|---|
| NR | 80 | 80 | 80 | 80 |
| BR | 20 | 20 | 20 | 20 |
| Silica | 40 | 40 | 40 | 40 |
| CB1 | 10 | 10 | | |
| CB2 | | | 10 | |
| CB3 | | | | 10 |
| Silane coupling agent 1 | 4 (10) | | 4 (10) | 4 (10) |
| Silane coupling agent 2 | | 4 (10) | | |
| Silane coupling agent X1 | | | | |
| Silane coupling agent X2 | | | | |
| Silane coupling agent X3 | | | | |
| Stearic acid | 1.5 | 1.5 | 1.5 | 1.5 |
| Sulfur | 2.3 | 2.3 | 2.3 | 2.3 |
| Accelerator | 1.4 | 1.4 | 1.4 | 1.4 |
| Hardness | 64 | 64 | 64 | 62 |
| Wear resistance | 107 | 109 | 101 | 100 |
| Cut resistance | 108 | 107 | 108 | 105 |
| Low heat build-up | 90 | 92 | 88 | 85 |
| Fatigue resistance | 107 | 108 | 112 | 115 |

TABLE 3

| Table 1-3 | Comparative Example 5 | Comparative Example 6 |
|---|---|---|
| NR | 80 | 80 |
| BR | 20 | 20 |
| Silica | 40 | 40 |
| CB1 | 10 | 10 |
| CB2 | | |
| CB3 | | |
| Silane coupling agent 1 | | |
| Silane coupling agent 2 | | |
| Silane coupling agent X1 | | |
| Silane coupling agent X2 | 4 (10) | |
| Silane coupling agent X3 | | 4 (10) |
| Stearic acid | 1.5 | 1.5 |
| Sulfur | 2.3 | 2.3 |
| Accelerator | 1.4 | 1.4 |
| Hardness | 65 | 66 |
| Wear resistance | 107 | 104 |
| Cut resistance | 100 | 98 |
| Low heat build-up | 93 | 98 |
| Fatigue resistance | 95 | 90 |

The details of each component shown in Table 1 above are as follows.

NR: natural rubber (STR 20)
BR: Nipol BR1220 (manufactured by Zeon Corporation)
Silica: ULTRASIL VN3GR ($N_2SA$=170 $m^2$/g; manufactured by Evonik)
CB1: Show black N234 (ISAF; $N_2SA$: 123 $m^2$/g; manufactured by Cabot Japan K.K.)
CB2: Show black N339 (HAF; $N_2SA$: 88 $m^2$/g; manufactured by Cabot Japan K.K.)
CB3: Show black N330T (HAF; $N_2SA$: 68 $m^2$/g; manufactured by Cabot Japan K.K.)
Silane coupling agent 1: the particular polysiloxane 1 synthesized as described above
Silane coupling agent 2: the particular polysiloxane 2 synthesized as described above
Silane coupling agent X1: Si69 (bis(3-(triethoxysilyl)propyl)tetrasulfide; manufactured by Evonik Degussa)
Silane coupling agent X2: the comparative polysiloxane 1 synthesized as described above Silane coupling agent X3: the comparative polysiloxane 2 synthesized as described above Stearic acid: Beads stearic acid YR (manufactured by NOF Corporation)

Sulfur: "Golden Flower" oil-treated sulfur powder (manufactured by Tsurumi Chemical Industry Co., Ltd.)

Accelerator: SANTOCURE CBS (manufactured by FLEXSYS)

All the working examples of the present application that used the particular polysiloxane as the silane coupling agent exhibited excellent wear resistance, cut resistance, and low heat build-up. All the working examples of the present application also exhibited excellent fatigue resistance. Among these, Working Examples 1 and 2 having the nitrogen adsorption specific surface area of the carbon black (R) of 90 to 150 m²/g exhibited better wear resistance. Of these, Working Example 1 in which the particular polysiloxane was the particular polysiloxane having a sulfide group-containing organic group (in formula (1) above, a is greater than 0) exhibited better cut resistance and better low heat build-up.

On the other hand, Comparative Example 1 in which a conventional silane coupling agent (silane coupling agent other than the particular polysiloxane) is used as the silane coupling agent exhibited insufficient cut resistance and insufficient low heat build-up. Furthermore, Comparative Example 2 in which the natural rubber content in the diene rubber was less than 60% by mass exhibited insufficient cut resistance. Furthermore, Comparative Example 4 in which the total content of the silica and the carbon was less than 30 parts by mass per 100 parts by mass of the diene rubber exhibited insufficient wear resistance and insufficient cut resistance. Furthermore, Comparative Example 5 in which the comparative polysiloxane 1 which contained neither "divalent organic group having a sulfide group" nor "monovalent hydrocarbon group having from 5 to 10 carbons" was used as the silane coupling agent, and Comparative Example 6 in which the comparative polysiloxane 2 which contained no "organic group having a mercapto group" was used as the silane coupling agent exhibited insufficient cut resistance.

What is claimed is:

1. A rubber composition for a tire for heavy loads comprising: diene rubber (P) containing at least 60% by mass of natural rubber; silica (Q); carbon black (R); and a silane coupling agent (S);
   - the silane coupling agent (S) being polysiloxane represented by an average compositional formula of formula (1) below;
   - a content of the silica (Q) being from 5 to 50 parts by mass per 100 parts by mass of the diene rubber (P);
   - a content of the carbon black (R) being from 5 to 40 parts by mass per 100 parts by mass of the diene rubber (P);
   - a total content of the silica (Q) and the carbon black (R) being from 30 to 70 parts by mass per 100 parts by mass of the diene rubber (P); and
   - a content of the silane coupling agent (S) being from 2 to 20% by mass relative to the content of the silica (Q):

$$(A)_a(B)_b(C)_c(D)_d(E)_e SiO_{(4-2a-b-c-d-e)/2} \quad (1)$$

wherein, A represents a divalent organic group having a sulfide group; B represents a monovalent hydrocarbon group having from 5 to 10 carbons; C represents a hydrolyzable group; D represents an organic group having a mercapto group; E represents a monovalent hydrocarbon group having from 1 to 4 carbons; and a to e satisfy relationships of formulas: $0 \leq a < 1$, $0 \leq b < 1$, $0 < c < 3$, $0 < d < 1$, $0 \leq e < 2$, and $0 < 2a+b+c+d+e < 4$; however, one of either a or b is not 0.

2. The rubber composition for a tire for heavy loads according to claim 1, wherein a nitrogen adsorption specific surface area of the carbon black (R) is from 60 to 150 m²/g.

3. The rubber composition for a tire for heavy loads according to claim 1, wherein, in the formula (1), a is greater than 0.

4. The rubber composition for a tire for heavy loads according to claim 1, wherein, in the formula (1), b is greater than 0.

5. The rubber composition for a tire for heavy loads according to claim 1, wherein the rubber composition is used for a tire tread.

6. The rubber composition for a tire for heavy loads according to claim 1, wherein the rubber composition is used for a bead filler.

7. A pneumatic tire produced by using the rubber composition for a tire for heavy loads described in claim 1.

8. A pneumatic tire produced by using the rubber composition for a tire for heavy loads described in claim 1 for a tire tread.

9. A pneumatic tire produced by using the rubber composition for a tire for heavy loads described in claim 1 for a bead filler.

10. The rubber composition for a tire for heavy loads according to claim 2, wherein, in the formula (1), a is greater than 0.

11. The rubber composition for a tire for heavy loads according to claim 2, wherein, in the formula (1), b is greater than 0.

12. The rubber composition for a tire for heavy loads according to claim 2, wherein the rubber composition is used for a tire tread.

13. The rubber composition for a tire for heavy loads according to claim 2, wherein the rubber composition is used for a bead filler.

14. A pneumatic tire produced by using the rubber composition for a tire for heavy loads described in claim 2.

15. A pneumatic tire produced by using the rubber composition for a tire for heavy loads described in claim 2 for a tire tread.

16. A pneumatic tire produced by using the rubber composition for a tire for heavy loads described in claim 2 for a bead filler.

17. The rubber composition for a tire for heavy loads according to claim 3, wherein, in the formula (1), b is greater than 0.

18. The rubber composition for a tire for heavy loads according to claim 3, wherein the rubber composition is used for a tire tread.

19. The rubber composition for a tire for heavy loads according to claim 3, wherein the rubber composition is used for a bead filler.

20. A pneumatic tire produced by using the rubber composition for a tire for heavy loads described in claim 3.

* * * * *